United States Patent [19]

Ortega

[11] 4,424,800
[45] Jan. 10, 1984

[54] THERMAL CONTROL SYSTEM AND METHOD FOR A PASSIVE SOLAR STORAGE WALL

[75] Inventor: Joseph K. E. Ortega, Westminister, Colo.

[73] Assignee: The United States of America as represented by the Department of Energy, Washington, D.C.

[21] Appl. No.: 282,286

[22] Filed: Jul. 10, 1981

[51] Int. Cl.$^3$ ............................................. F24J 3/02
[52] U.S. Cl. .................................. 126/419; 126/429; 126/430; 126/436
[58] Field of Search ............... 126/419, 422, 430, 436, 126/417, 441, 400, 429, 431; 165/12, 18

[56] References Cited

U.S. PATENT DOCUMENTS

| | | | |
|---|---|---|---|
| 2,595,905 | 5/1952 | Telkes | 126/419 |
| 2,767,118 | 10/1956 | Gaymont | 165/12 |
| 2,853,205 | 9/1958 | Boyd | 165/12 |
| 2,969,918 | 1/1961 | Phelps | 126/419 |
| 3,102,532 | 9/1963 | Shoemaker | 126/441 |
| 3,860,055 | 1/1975 | Wild | 126/419 |
| 3,983,928 | 10/1976 | Barnes | 165/12 |
| 4,002,159 | 1/1977 | Angilletta | 126/429 |
| 4,059,226 | 11/1977 | Atkinson | 126/429 |
| 4,201,188 | 5/1980 | Cummings | 126/429 |
| 4,219,008 | 8/1980 | Schultz | 126/422 |
| 4,223,663 | 9/1980 | Carmichael | 126/430 |
| 4,248,375 | 2/1981 | Whitney | 165/12 |
| 4,250,871 | 2/1981 | Milburn | 126/436 |
| 4,257,477 | 3/1981 | Maloney | 126/430 |
| 4,277,018 | 7/1981 | Nelson | 165/12 |
| 4,280,480 | 7/1981 | Raposo | 126/436 |
| 4,290,416 | 9/1981 | Maloney | 126/400 |
| 4,301,787 | 11/1981 | Rice | 126/429 |
| 4,327,795 | 5/1982 | Wheeler | 126/429 |
| 4,338,917 | 7/1982 | Keller | 126/436 |

FOREIGN PATENT DOCUMENTS

2452068 11/1980 France ................................ 126/430

Primary Examiner—Daniel J. O'Connor
Attorney, Agent, or Firm—John L. Isaac; Jeannette M. Walder; Richard G. Besha

[57] ABSTRACT

The invention provides a system and method for controlling the storing and release of thermal energy from a thermal storage wall wherein said wall is capable of storing thermal energy from insolation of solar radiation. The system and method includes a device such as a plurality of louvers spaced a predetermined distance from the thermal wall for regulating the release of thermal energy from the thermal wall. This regulating device is made from a material which is substantially transparent to the incoming solar radiation so that when it is in any operative position, the thermal storage wall substantially receives all of the impacting solar radiation. The material in the regulating device is further capable of being substantially opaque to thermal energy so that when the device is substantially closed, thermal release of energy from the storage wall is substantially minimized. An adjustment device is interconnected with the regulating mechanism for selectively opening and closing it in order to regulate the release of thermal energy from the wall.

14 Claims, 14 Drawing Figures

THERMAL CONTROL SYSTEM AND METHOD FOR A PASSIVE SOLAR STORAGE WALL

The United States Government has rights to this invention pursuant to Contract No. EG-77-C-01-4042 between the U.S. Department of Energy and the Solar Energy Research Institute, a division of the Midwest Research Institute.

BACKGROUND OF THE INVENTION

1. Field of the Invention

The present invention relates to a passive solar energy system and more particularly to a passive thermal storage system. Specifically, the present invention relates to a system and method for controlling the charging of a thermal storage wall through insolation of solar energy and through the release of thermal energy from the thermal storage wall.

2. Description of the Prior Art

The use of solar insolation for heating buildings of passive solar design has increased significantly in the past several years due to the substantial savings of such systems over heating systems in conventional buildings using fossil fuel energy. Although a number of different and useful techniques have been developed for use in passive solar design to increase the storage of solar radiation during the daylight hours, suitable techniques for regulating the control of this stored solar radiation (in the form of thermal energy) are not truly satisfactory. A common technique for storing solar radiation in the form of thermal energy is to use a masonry, such as brick, concrete, adobe, or stone, or a water wall or cylinder such as what has been commonly termed the Trombe wall. Thermal energy stored in such walls is released by free convection air currents and by thermal radiation.

Conventionally, once a solar passive building is designed and constructed, the thermal behavior of that building is controlled primarily by its external thermal environment. Without using any supplementary or auxiliary heat, the average room temperatures of such solar passive buildings are higher during the day when insolation occurs and lower at night and in the early morning hours. The variations between the high and the low temperatures in each room is a function of the building design and the magnitude of change in weather conditions. Often the difference of variation can be large, such as 15° F. or greater.

Most passive solar buildings are constructed as a single zone wherein the building is typically one room deep with the south end of each room designed to receive solar radiation through typically glass enclosed openings. In such passive building designs, rear or back rooms, behind the first room, cannot be effectively heated by solar radiation. One solution to this problem has been to use free convection in order to transfer heat from the front room or zone to the back room or zone. Free air, however, has a small heat capacity, and difficulties are generally encountered in controlling and setting up suitable convection patterns. Furthermore, heat transferred through the storage walls (i.e., interzonal transfer) is limited since masonry materials are especially poor thermal conductors.

In some techniques, regulation of heat transfer from the storage wall has been accomplished by use of a fan. The use of such a device, however, has limitations. A fan generally helps to improve heat transfer but it cannot provide the additional impedance needed during charging of the thermal walls (i.e., during the day) to prevent overheating of the front room and to improve storage wall performance.

Another technique is to employ the use of an auxiliary heat source to supplement the temperature of the rooms during the night and early morning hours.

Another approach has been to utilize moveable insulation and louver shading devices to provide a degree of passive thermal control. These types of shading devices affect the degree by which the thermal wall is charged by solar insolation. Such techniques, however, do not control the release of thermal energy from the storage wall into the air space of the room. Furthermore, shading devices do not provide directional or graduated control over the discharge of thermal energy and fail to improve interzonal heat transfer from a front room to a back room or improve the heat storage performance of the storage wall itself.

SUMMARY OF THE INVENTION

Therefore, it is one object of the present invention to provide a system and method for reducing overheating of a passive solar room during charging of a storage wall situated therein.

It is another object of the present invention to provide a system and method for improving thermal storage performance of a storage wall in a passive solar room.

It is a further object of the present invention to provide graduated control over the release of stored thermal energy from a storage wall into a passive solar room.

Yet another object of the present invention is to provide improved interzonal heat transfer from one side of a thermal storage wall to the other.

Accordingly, the thermal control system of the present invention provides a solution to the above described problems and includes a regulating device, preferably in the form of a plurality of louvers, spaced a predetermined distance from the surface of a thermal wall exposed to solar radiation. A mechanical device is provided for selectively opening and closing the louvers under a temporal control, a manual control, a thermostatic control, or a combination thereof. The louvers are preferably made from a material, such as glass, which is substantially transparent to solar radiation. This enables the thermal storage wall to be charged through insolation of solar radiation whether or not the louvers are fully opened, fully closed, or in any position therebetween.

The louver material is further substantially opaque to the release of thermal energy when the louvers are fully closed. Additionally, when the louvers are fully closed, thermal release from the storage walls due to free air convection is substantially minimized, and when the louvers are selectively and gradually opened, the thermal release due to both radiation from the wall and due to free convection can be selectively directed into the room. The provision of the louvers in front of the thermal wall also increases the storage of thermal energy per unit of incident solar radiation when the louvers are near or in the closed position, and provide for greater interzonal transfer of energy through the storage wall.

BRIEF DESCRIPTION OF THE DRAWINGS

The novel features which are believed to be characteristic of the present invention are set forth in the appended claims. The invention itself, however, together with further objects and attendant advantages thereof, will become apparent and best understood by reference to the following detailed description taken in connection with the accompanying drawings, setting forth by way of illustration and example certain embodiments of the invention in the several figures of which like reference numerals identify like elements, and in which:

DETAILED DESCRIPTION OF THE PREFERRED EMBODIMENTS

Figures 1, 2:
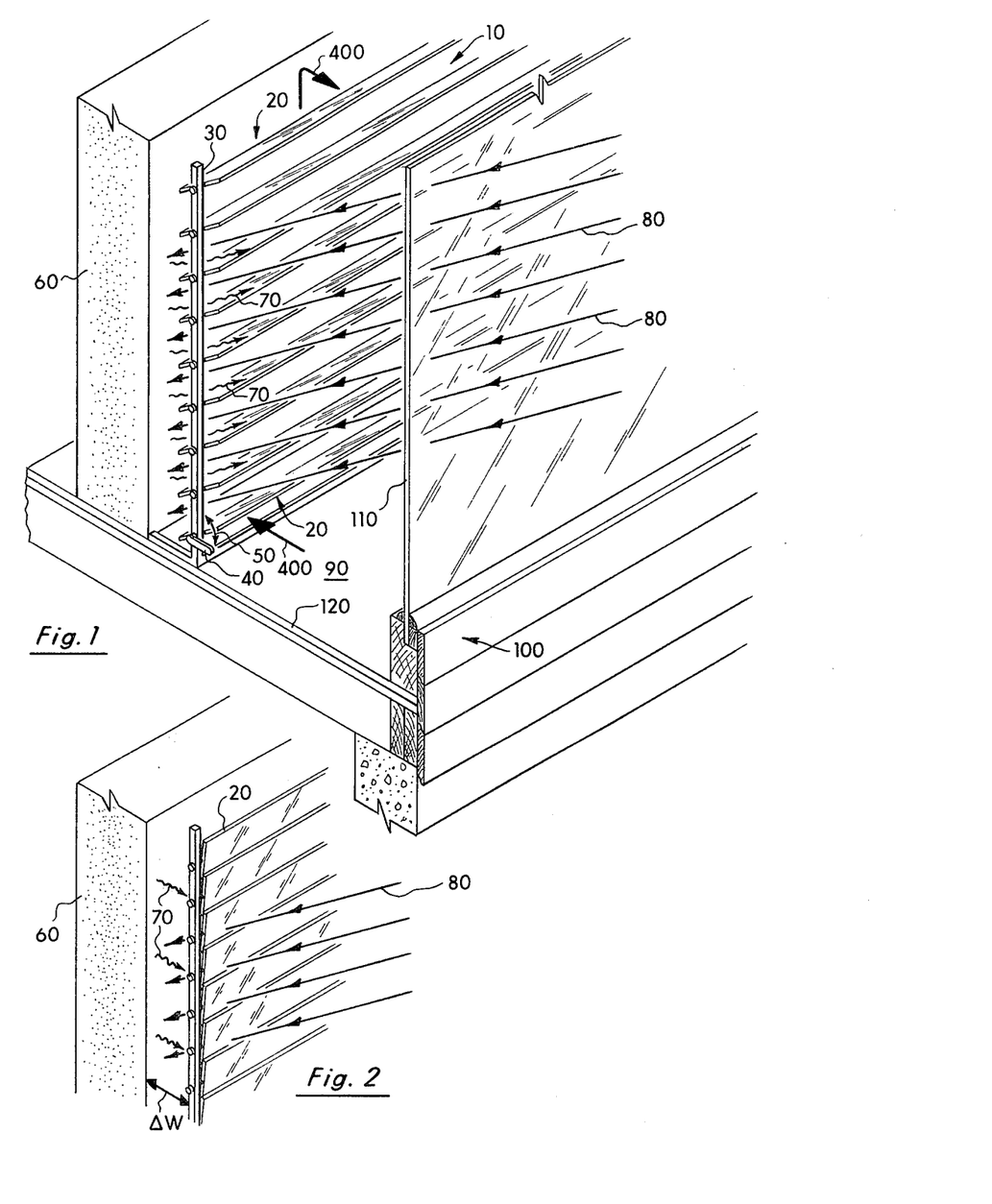
FIG. 1 is a cut-away perspective view illustrating the thermal control system of the present invention in front of a room thermal wall being charged by incoming solar radiation.
FIG. 2 is a cut-away perspective view illustrating the thermal control system, as shown in FIG. 1, in the fully closed position.

Referring first to FIG. 1, a thermal control system 10 of the present invention is shown, in the preferred embodiment, to include a plurality of louvers or pivotal slots 20 connected through a link 30 to an operating lever 40 which can move in the directions of the arrows 50. The thermal control system 10 of the present invention is shown mounted substantially over and in front of a thermal storage or transfer wall 60 which may comprise, for example, a wall constructed of masonry or water. One purpose of the thermal control system of the present invention is to regulate the release of thermal energy, illustrated by arrows 70, from the storage or transfer wall 60 which conventionally gains energy from solar radiation 80 from the sun through insolation.

As shown in FIG. 1, the storage wall 60 can be conventionally mounted in a room 90 of a building 100. The front of the building 100 includes a window 110 through which the solar radiation 80 is directed onto the thermal storage wall 60. The building 100, the window 110, the floor of the building 120, and the thermal storage or transfer wall 60 are well known and can be conventionally constructed. It is to be expressly understood that other applications of the present invention in structures such as greenhouses and the like could also be made.

The purpose of the thermal control system 10 of the present invention, as previously mentioned and as shown in FIGS. 1 and 2, is to regulate the release of stored thermal energy from the thermal storage wall 60 into the room 90 of the building 100. Such regulation occurs through the timed, manual, or thermostatically controlled operation of lever 40 to open or close the louvers 20. The louvers 20 are constructed from material which is substantially transparent to the incoming solar radiation 80 in order to permit the rays 80 to charge the wall 60 when the louvers 20 are either partially opened, fully opened or closed. The material of louvers 20, however, is also substantially opaque or nonconductive of the released thermal energy when the louvers 20 are closed. This release of thermal energy from wall 20 occurs by two mechanisms: free convection as illustrated by arrows 400, and thermal radiation 70. Hence, when the louvers 20 are fully opened by the lever 40, the release of thermal energy from the wall 60 occurs at a maximum rate. On the other hand, when the louvers 20 are fully closed, as shown in FIG. 2, the thermal energy from the storage wall 60 is contained in the wall 60 and in the space between the wall 60 and the louvers 20 which is designated by a width of $\Delta W$. When the louvers 20 are in a closed position, release of thermal energy by free convection 400 and thermal radiation 70 is significantly minimized. Furthermore, when the louvers 20 are fully closed, the temperature of the room 90 is lowered, and more thermal energy is stored in the storage wall 60 per unit of incident solar radiation than without the use of the thermal control system 10 of the present invention.

When the louvers 20 are fully opened by the lever 40, the incoming solar radiation 80 impacts on the thermal storage wall 60, and stored thermal energy is released by radiation 60 and free convection 400 into the room 90 at a maximum rate. Regulation of the lever 40 (manually or automatically) effectuates regulation of the release of the thermal energy from the wall 60 and, hence, when the louvers 20 are fully closed, a minimum of thermal energy from the storage wall 60 is released into the room 90. The operation of the lever 40 provides regulation between the maximum and minimum rates of thermal energy release. Furthermore, operation of the lever 40 provides a significant directional control for the release of the stored thermal energy.

When a user of the room 90 desires more heat in order to maintain the room at a comfortable level, the user (or a thermostatic or timed device) operates the lever 40 to open the louvers 20 to provide increased thermal energy release (70 and 400) into the room 90. Likewise, when less heat is needed, the user of the room 90 may activate the lever 40 in the opposite direction to more fully close the louvers 20.

It is to be appreciated that sliding, hinged, or removable panels, parallel and adjacent to the storage wall 60, but not in contact with the wall, and made from the same material as the louvers 20 can provide the same type of regulation over release of the thermal energy from the wall 60. The selective opening of such louvers or panels essentially provides a variable impedance to heat transfer from the storage wall 60 to the room 90. A high impedance is provided, in one instance, by reducing radiation exchange between the wall and the room, and, in the second instance, by reducing free convection into the room. A low impedance occurs through opening the louvers 20 to provide an increased release of thermal energy.

It is to be further appreciated that a number of conventional arrangements can be utilized in the thermal control of the present invention to operate the opening and closing of the louvers 20 or similar panels under both a manual or an automatic control as will be more fully discussed below.

Figure 3:
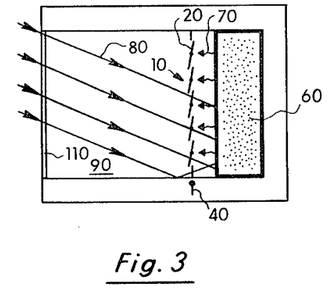
FIG. 3 is a schematic illustrating a direct gain/single zone mode of operation of the present invention during the daytime hours.
Figure 4:
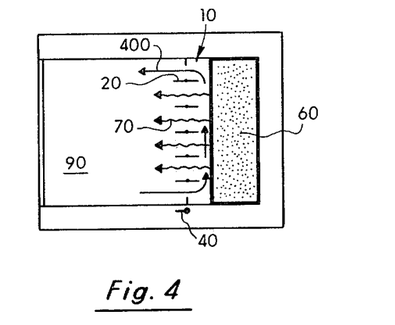
FIG. 4 is a schematic illustrating the thermal control system of the present invention, as shown in FIG. 3, during night time operation.
Figure 5:
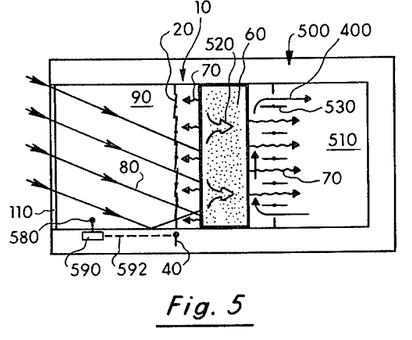
FIG. 5 is a schematic illustrating the daytime operation of a direct gain/dual zone mode of operation using two thermal control systems of the present invention.
Figure 6:
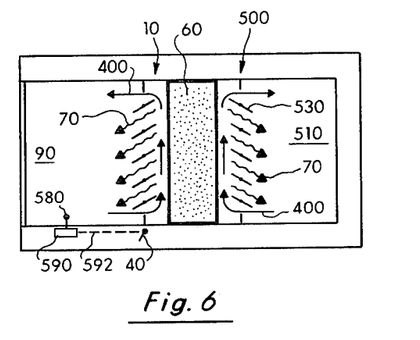
FIG. 6 is a schematic illustrating the arrangement shown in FIG. 5 during night time operation.
Figure 7:
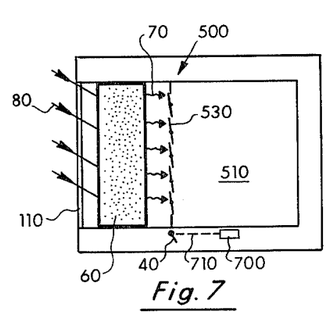
FIG. 7 is a schematic illustrating an indirect gain/single zone mode of operation during the daytime for the thermal control system of the present invention.
Figure 8:
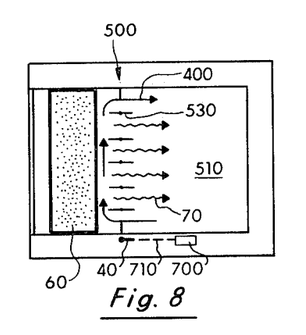
FIG. 8 is a schematic illustrating the thermal control system shown in FIG. 7 during night time operation.

Referring now to FIGS. 3 through 8, the thermal control system of the present invention is shown in applications exhibiting three different modes of operation. FIGS. 3 and 4 illustrate the day and night use of the thermal control system 10 of the present invention in a direct gain/single zone mode operation. FIGS. 5 and 6 illustrate the day and night use of the thermal control system 10 of the present invention in a direct gain/dual zone mode of operation. Finally, FIGS. 7 and 8 illustrate the day and night use of the thermal control system 10 of the present invention in an indirect gain/single zone mode of operation. Each of these modes of operation is discussed in more detail below.

In FIGS. 3 and 4, the use of the thermal control system 10 of the present invention is shown in a direct gain/single zone mode of operation. FIG. 3 illustrates a daytime operation whereas FIG. 4 shows a night time operation. During the day, the louvers 20 are closed and, in passive solar buildings, sufficient thermal radiation is allowed into the building to provide adequate heating of the building without use of thermal heat release from the storage wall 60. Hence, the thermal control system 10 is generally in the fully closed position thereby entrapping the thermal energy within the dead air space $\Delta W$ (FIG. 2) as well as increasing thermal storage in the storage wall 60. In the closed position, the louvers 20 of the thermal control system 10 of the present invention are opaque to the thermal energy 70 which is of a significantly longer wavelength than the incoming solar radiation 80 and, therefore, more energy is stored. Hence, a solar charging of the thermal storage wall 60 occurs during the period of time (daylight) in which the louvers 20 are closed.

At night time, and as shown in FIG. 4, the louvers 20 are fully opened, and the thermal radiation 70 is allowed to dissipate into the room 90 at a rate determined by the graduated degree which the louvers 20 are opened.

Hence, and as shown in FIGS. 3 and 4, the thermal control system 20 of the present invention in a direct gain/single zone approach provides three definite advantages. First, during the daytime hours when additional heat is not needed in the room 90 because the room temperature is sufficiently high from incoming solar radiation and higher outside ambient temperature, thermal energy storage per unit incident solar energy in the wall 60 is increased. Second, the stored thermal energy can be released into the room 90 during the night and early morning hours by free convection 400 and by radiation 70 when there is no insolation and when the outside ambient temperatures are lower. Finally, the amount of heat released into the room can be controlled to suit the user's needs, at any time, to accommodate varying outside ambient temperatures and changing environmental conditions during the day-night cycle.

When the louvers 20 are opened, a free air circulation path 400 occurs in room 90 and in the air space ($\Delta W$) between the thermal control system of the present invention and the wall 60 so as to remove thermal energy from the face of the wall 60. When the louvers 20 are closed, such a circulation path 400 is prevented.

Referring to FIGS. 5 and 6, the thermal control system of the present invention is shown in a direct gain/two zone mode of operation. In this mode of operation, the first thermal control system 20 is used in a front room 90, and a second thermal control system 500 is utilized in a rear room 510. As shown in FIGS. 5 and 6, the room 90 and the thermal control system 20 associated therewith operates in the same fashion as set forth in FIGS. 3 and 4. What is added in FIGS. 5 and 6 is the provision to heat the room 510, representing a second heating zone, during the daytime as shown in FIG. 5 and during the night time as shown in FIG. 6. The arrangement shown in FIGS. 5 and 6 improves interzonal heat transfer (i.e., the transfer of heat from the room 90 to the room 510). As shown in FIG. 5, with the louvers 20 of the thermal control system 10 closed, heat builds up in the dead air space and in the thermal mass 60. This buildup of heat is delivered back through the thermal mass 60 as shown by the arrows 520 for radiation into the back room 510. Hence, the thermal control system 20 serves to charge the mass 60 and to drive heat rearwardly in the wall into a back or rear room 510. Of course, the louvers 530 can also be in a closed position if radiated heat 70 is not immediately required in the back room 510, thereby permitting even greater thermal storage in the wall 60 for subsequent use in the rooms 90 and 510.

At night time, as shown in FIG. 6, the louvers 20 and 530 for the systems 10 and 500 can be adjustably opened in various degrees to provide variable amounts of thermal energy release into the rooms 90 and/or 510. Of course, the louvers 530 in the thermal control system 500 do not need to be transparent to solar radiation since solar radiation does not impinge on the thermal mass wall 60 from that direction. Such louvers 530, however, must be opaque (i.e., non-transmittive thereof) to thermal radiation. In this approach, interzonal (i.e., from the front room 90 through the wall 60 and into the back room 510) transfer of thermal energy occurs.

In FIGS. 7 and 8, an indirect gain/single zone mode of operation is ilustrated for day and night operation. In FIG. 7, the solar radiation insolates thermal mass 60 through the glass 110. During daytime operation, the thermal control system 500 could have its louvers 530 fully closed or partially opened to provide the desired heat to the room 510. At night time, the louvers 530 of the system 500 are opened to permit release of the stored thermal energy in wall 60 into the room 510, as shown in FIG. 8.

The lever 40 is illustrated in FIGS. 3 through 8 in various operative positions under three types of preferred control. In FIGS. 3 and 4, a manual control is provided which the user operates based upon the user's personal comfort. In FIGS. 5 and 6, a temperature sensor 580 is coupled to an electronic or mechanical control which operates the lever 40 through a mechanical linkage 592. In this embodiment, the user sets a thermostatic control 590 to a desired temperature, and the louvers are then activated accordingly. Finally, and as shown in FIGS. 7 and 8, a timed control mechanical or electric circuit 700 is connected by a mechanical linkage 710 to the lever 40. In this embodiment, the user of the present invention sets a clock to activate the opening and closing of the louvers at certain timed intervals.

Figure 9:
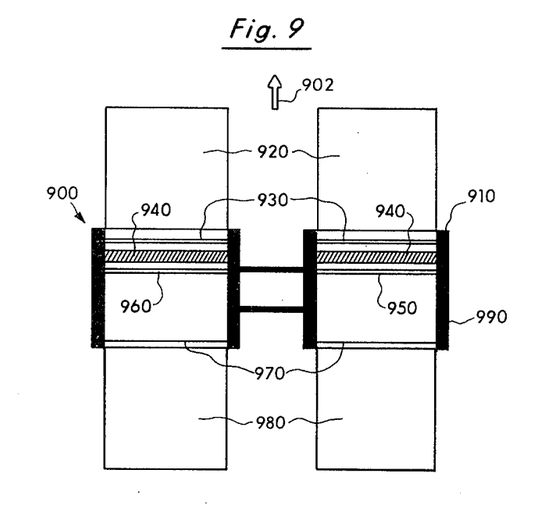
FIG. 9 is a top planar schematic view of experimental and control boxes for testing the thermal control system of the present invention.

To experimentally test the thermal control system 10 of the present invention, two identical test boxes 900 and 910 as shown in FIG. 9 were utilized. The boxes were oriented towards the South (arrow 902). The inner dimensions of each test box were 0.91 m × 0.91 m × 0.91 m (3' by 3' by 3'). In front of each test box 900 and 910 was placed a reflector 920. Double glazed glass 930 was utilized in front of the storage wall 940. In the "control" box 910, horizontal louvers 950 were utilized in the fully opened position. For the "experimental" box 900, horizontal louvers 960 were provided such that the louvers 960 could be variably opened and closed. At the end of the test box was an aluminum panel 970 followed by an insulation panel 980. The panels 920 and 980 were hinged to the boxes 900 and 910. During the day, the panels 920 and 980 were lowered to allow solar radiation into the boxes from the South and to permit heat loss from the North. At night time, the panels were closed. A layer of polyurethane insulation on the sides 990 covered the outside and bottom of the boxes. The thermal storage wall 940 was a 9.2 cm (3.625 in.) thick concrete brick wall and, as shown in FIG. 9, the wall was arranged to test the mode of operation set forth in FIGS. 7 and 8 for the indirect/single zone. Each test box contained thermocouples at various locations in order to measure temperature.

Figure 10:
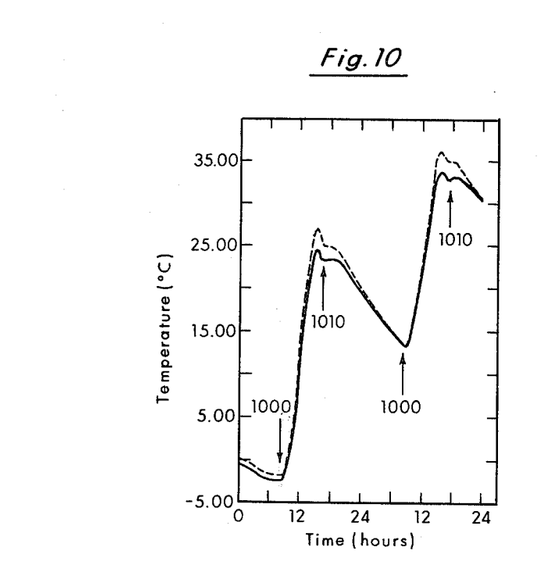
FIG. 10 is a graph illustrating the room temperature cycling of the experimental and control boxes of FIG. 9 over a two day period of operation.
Figure 11:
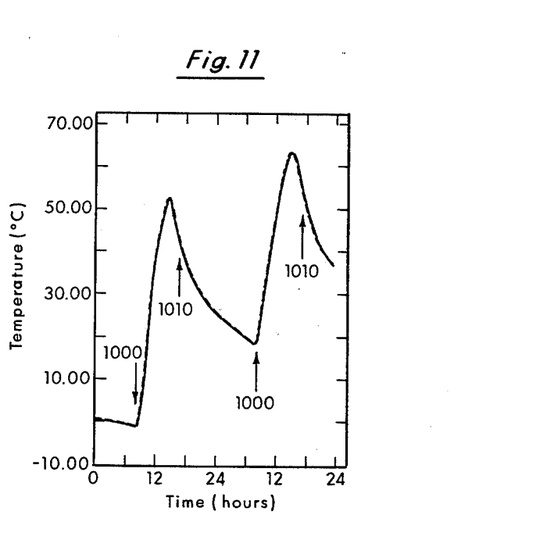
FIG. 11 is a graph of the experimental and control boxes of FIG. 9 illustrating the temperature variations of the thermal wall over a two day period of operation.

FIG. 10 sets forth the graph of room air temperature of the experimental and control boxes 900 and 910 with the louvers opened as a function of time. The room air temperature behaviors of both boxes 900 and 910 are substantially identical through the temperature cycling. In FIG. 11, the average storage wall temperature of the boxes, as a function of time, for the same test as that presented for FIG. 3, are plotted. Again, the curves are nearly identical. In making the comparative cycling tests, between the two boxes 900 and 910, the temperatures for the two boxes did not differ by more than two degrees centigrade and on the average differed by less than one degree centigrade. Hence, the "experimental" box 900 and the "control" box 910 demonstrated similar temperature behaviors independent of the application of the thermal control system of the present invention (i.e., with the louvers fully opened). Therefore, the altered temperature behavior caused by regulation of the thermal control system 10 of the present invention can be closely evaluated and determined. In FIGS. 10 and 11, points-in-time 1000 are indicative of when the front panel 920 and the back panel 980 were opened and points-in-time 1010 are indicative of when these panels were closed.

Figure 12:
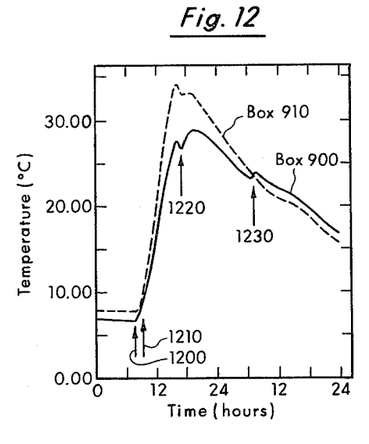
FIG. 12 is a chart illustrating the experimental and control boxes of FIG. 9 over a two day period of operation for room temperature with the thermal control system of the present invention being operated.
Figure 13:
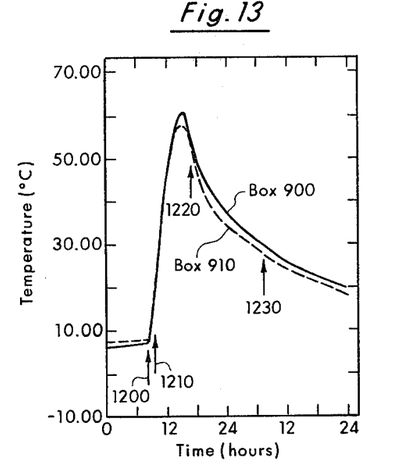
FIG. 13 is a graph showing the storage wall temperature variations for the experimental and control boxes of FIG. 9 over a two day period of time during which the thermal control system of the present invention is operated.

In FIGS. 12 and 13, the effect of closing the louvers of the present invention during charging and the subsequent opening of the louvers during discharging for the "experimental" box 900 are illustrated. In FIG. 12, the room air temperature as a function of time, for both boxes 900 and 910, is plotted. At point-in-time 1200 (approximately 8:20 a.m.), the front 920 and back 980 panels were opened. At point-in-time 1210 (approximately 9:30 a.m.), the glass louvers 960 in the "experimental" box 900 were closed. As witnessed in FIG. 12, the temperature of the room then increases. At point-in-time 1220 (approximately 5:30 p.m.) the front 920 and back 980 panels were closed. At point-in-time 1230 (approximately 7:00 a.m. the following morning), the glass louvers 960 were opened.

The results in FIG. 12 show that at peak temperatures, the room air temperature for the "experimental" box 900 was approximately 5 degrees lower than that of the control test box. Thus, closing of the louvers 960 lowered the heating of the room air temperature during charging by about five degrees, which represents the heat being retained in the storage wall. At point-in-time 1230 (7:00 a.m. the next morning), the glass louvers 960 were opened and the room air temperature increased due to a release of the stored thermal energy.

FIG. 13 sets forth the temperature plots for the average temperature of the storage wall 940 during these same points-in-time and shows that the additional thermal energy not released when the louvers 960 are closed is stored for future discharge.

Figure 14:
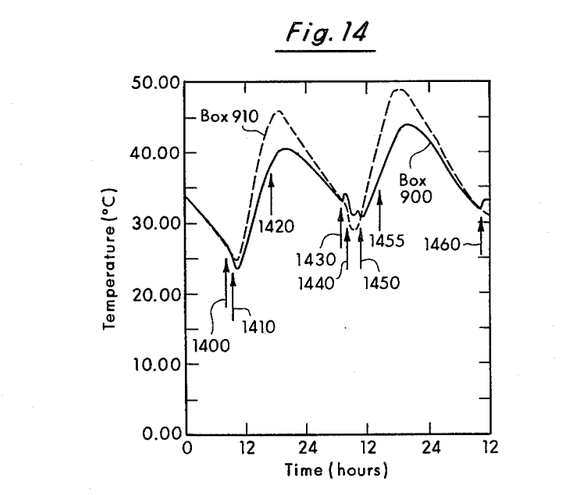
FIG. 14 is a graph illustrating room temperature variations with time for the experimental and control boxes of FIG. 9 with the thermal control system of the present invention being operated.

FIG. 14 plots the effect of opening and closing the glass louvers 960 over a two day period. At point-in-time 1400 the front 920 and back 980 panels were opened (approximately 8:15 a.m. on the first day). The glass louvers 960 were closed in the experimental box 900 at point-in-time 1410 (approximately 9:15, the first day). The front and back panels were closed at point-in-time 1420 (approximately 4:45 p.m. the first day) and remained closed until point-in-time 1440 (approximately 7:00 a.m. the second day). The louvers 960 were opened between points-in-time 1430 and 1450 (between approximately 7:00 a.m. and 10:30 a.m., the second day) and then were kept closed for the remainder of the day and night. The front panel 920 and back panel 980 were opened at point-in-time 1455 (approximately 8:00 a.m., the second day) and closed at point-in-time 1460 (approximately 4:20 p.m., the second day).

As mentioned above, FIG. 14 sets forth the plot of the room air temperature as a function of time and demonstrates the observed affect of opening and closing louvers 960 based on a predetermined time sequence. In FIG. 14, the use of the thermal control system of the present invention reduced the magnitude of room air temperature fluctuations, in some cases as much as 44%.

It is to be expressly understood that although the glass louvers 960 were utilized, the louvers 960 can be made of material other than glass. This is especially true when, as in the test boxes, the intended mode of operation in an indirect gain/single zone application as set forth in FIGS. 7 and 8. In this mode of operation, the requirement of transparency for solar radiation is not necessary. Hence, when thin polished aluminum is utilized as the material for the louvers, tests indicate that more energy is stored during charging by as much as 12% since aluminum louvers can provide more than twice the thermal impedance of glass louvers. Finally, the use of glass louvers during the charging of the storage wall allows more energy to be stored in the storage wall for future use, and as set forth in FIG. 13, this amounts to about 5% of the incident energy.

It is to be appreciated that the use of the thermal control system of the present invention on thermal storage walls in passive solar buildings provides a temporal and a graduated control over the rate of thermal energy released by radiation and by free convection from the thermal storage wall. In addition, increased storage of energy per unit of incident solar energy in the wall and interzonal transfer of energy through the wall occurs.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

What I claim is:

1. A thermal control system for a thermal storage wall wherein said thermal wall is capable of storing thermal energy from insolation of solar radiation, said system comprising a single regulating means spaced a predetermined distance from said thermal wall for controlling a charging of said wall and for regulating the release of thermal energy from said wall, said regulating means being selectively adjustably operable in a range from a fully opened to a fully closed position, said regulating means being substantially transparent to said incoming solar radiation such that when said regulating means is in any position said wall receives substantially all of said solar radiation, and wherein said regulating means is substantially opaque to said thermal energy.

2. A thermal control system as described in claim 1, wherein said regulating means increases the amount of thermal heat stored in said thermal wall when fully closed.

3. A thermal control system as described in claim 2, wherein said system further comprises means operatively interconnected with said regulating means for automatically controlling said regulating means over preset intervals of time.

4. A thermal control system as described in claim 1, wherein said regulating means comprises a plurality of louvers made from a material substantially transparent to said solar radiation and substantially opaque to said thermal energy, and wherein said system further comprises means for selectively opening and closing said louvers in order to regulate the release of thermal energy from said thermal wall.

5. A thermal control system as described in claim 1, wherein said regulating means is adapted for operation in an open position to enable said thermal energy to be released from said wall be free convection and by thermal radiation, and wherein said regulating means is further adapted for operation in a closed position to substantially minimize said release of thermal energy by said free convection and by said thermal radiation.

6. A thermal control system as described in claim 1, wherein said regulating means is adapted for operation between a fully closed position and a fully open position to provide regulation of said thermal energy between maximum and minimum ranges of said thermal energy released.

7. A thermal control system as described in claim 1, wherein said system is adaptable for regulating said release of stored thermal energy into a desired external zone, and wherein said means for selectively adjusting said regulating means enables said regulating means to be selectively opened and closed in direct response to variations in temperatures defined by said external zone.

8. A thermal control system as described in claim 7, wherein said means for selectively adjusting said regulating means is adapted to regulate said opening and closing of said regulating means by either timed operation, manual operation, or thermostatic operation.

9. A thermal control system for a thermal storage wall disposed in a room wherein said thermal storage wall is capable of storing thermal energy from insolation of solar radiation, said system comprising:

means spaced a predetermined distance from said thermal wall for regulating the release of thermal energy from said thermal wall into said room, said regulating means being operable between a closed position and an open position, said regulating means being substantially transparent to said incoming solar radiation such that said wall receives substantially all said incoming solar radiation impacting on said regulating means when said regulating means is in any position, and said regulating means being substantially opaque to thermal energy, said regulating means being adapted to release said thermal energy in an open position; and means operatively connected to said regulating means for controlling said regulating means.

10. A thermal control system as described in claim 9, wherein said regulating means comprises a plurality of louvers substantially covering the side of said storage wall disposed to said solar radiation, each of said louvers being made from a material substantially transparent to said solar radiation so that when said louvers are in any said operative position, said thermal storage wall receives substantially all of said impacting solar radiation, said material further being substantially opaque to said thermal energy so that when said louvers are substantially said closed, said thermal release from said storage wall through free convection air current and through thermal radiation from said storage wall is substantially minimized, and wherein said controlling means comprises a device operatively connected to said louvers for selectively opening and closing said louvers in order to regulate the release of thermal energy from said wall and for directing the release of said thermal energy from said wall in predetermined directional patterns, said controlling means further including actuating means operatively connected to said opening and closing means for controlling the opening and closing of said louvers.

11. The thermal control system as described in claim 10, wherein said actuating means comprises means manually preset to selectively open and close said louvers according to a predetermined pattern of time intervals.

12. The thermal control system as described in claim 10, wherein said actuating means comprises means for controlling the opening and closing of said louvers based upon variations in said room temperature.

13. The thermal control system as described in claim 12, wherein said actuating means comprises a temperature sensor located in said room, and means receptive of temperature readings from said sensor for selectively opening and closing said louvers in order to maintain the temperature at a present value.

14. A thermal control system for a thermal storage wall located between a first room and a second room wherein said thermal wall is capable of storing thermal energy from insolation of solar radiation in said first room, said system comprising:

first means in said first room spaced a predetermined distance from said thermal wall for regulating the release of thermal energy from said thermal wall into said first room, said first regulating means being operable in a range from a fully opened to a fully closed position, said first regulating means being substantially transparent to said incoming solar radiation such that when said regulating means is in any position said wall receives substantially all said incoming solar radiation, and said regulating means being substantially opaque to said thermal energy; and second means in said second room spaced a predetermined distance from said thermal wall for regulating the release of thermal energy from said thermal wall into said second room, said second regulating means being substantially opaque to said thermal energy.

* * * * *